April 29, 1924.
A. R. TRIST
1,492,055
FLOAT CONTROLLED DEVICE SUCH AS FEED WATER REGULATORS AND THE LIKE
Filed Feb. 28. 1922
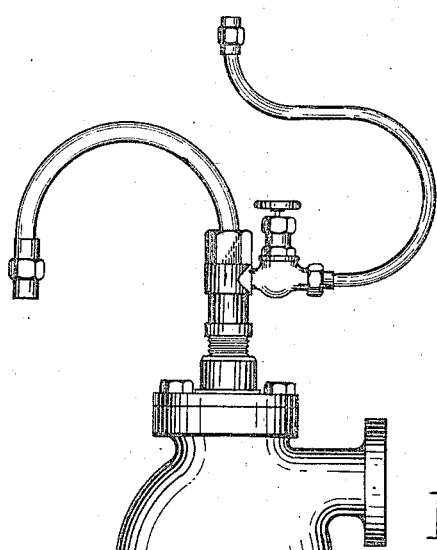
Fig:1:
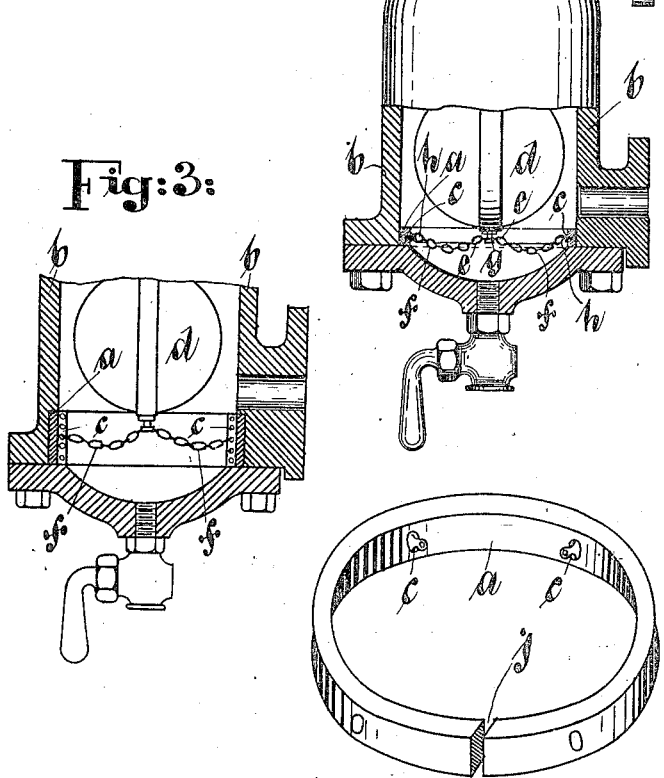
Fig:3:
Fig:2:
Arthur Ronald Trist.
INVENTOR;
By
his Attorney Patented Apr. 29, 1924.

1,492,055

UNITED STATES PATENT OFFICE.

ARTHUR RONALD TRIST, OF LONDON, ENGLAND.

FLOAT-CONTROLLED DEVICE, SUCH AS FEED-WATER REGULATORS AND THE LIKE.

Application filed February 28, 1922. Serial No. 539,896.

*To all whom it may concern:*

Be it known that I, ARTHUR RONALD TRIST, a subject of the King of Great Britain and Ireland, residing at Dinneford House, 12 Clipstone Street, London, England, formerly of Coronation House, 4 Lloyds Avenue, London, England, have invented new and useful Improvements in and Relating to Float-Controlled Devices, such as Feed-Water Regulators and the like, of which the following is a specification.

This invention relates to improvements in float controlled devices such as feed water regulators and the like and has for its object a construction whereby more reliable operation during oscillation or disturbance of the devices may be obtained, than is possible with known constructions.

This invention is particularly applicable to feed water regulators of the type described in specification of British Letters Patent granted to me under No. 19296 and date the 29th August, 1911.

In the past it has been suggested to employ chains or the like to limit the movement of floats when the structure of the device as a whole is inclined or oscillated said chain or the like being anchored at one end to the float and at their other ends to the structure.

This invention consists in the arrangement of an auxiliary structure to which one end of each chain viz, that remote from its attachment to the float, is anchored; said points of anchorage being adapted to be displaced when the location of the travel of the float is changed.

In order that the invention may be the better understood, I will now proceed to describe the same in relation to the accompanying drawings, reference being had to the letters and figures marked thereon. Like letters refer to like parts in the various figures in which:—

Fig. 1 is an elevation partly in section of a device constructed according to this invention.

Fig. 2 is a perspective view of the auxiliary structure.

Fig. 3 illustrates an alternative construction.

Referring to Fig. 1 of the drawings the ring $a$ or the like is disposed in and is frictionally supported by contact with the chamber walls $b$ said ring $a$ being adapted to permit of free motion of the float $d$, within predetermined limits, relative thereto.

The ring $a$ is provided with points of anchorage $c$ in number as many as desired, the ring $a$ and points of anchorage $c$ being suitably located relative to the float $d$. Generally speaking the ring $a$ with the points of anchorage $c$ will be disposed beyond the point $g$ of greatest radius of movement of the float $d$ when the path of travel of the said float $d$ is displaced from its normal position due to inclination or oscillation as illustrated in Fig. 1.

If such arrangement is adopted then one end $e$ of each of the chains $f$ will be attached to the said point $g$ on the float $d$ whilst the remaining ends $h$ will be connected to the points of anchorage $c$ on the ring $a$.

Obviously the length of the chains $f$ will be such that although free movement of the float $d$ during its normal functions will be obtained the float $d$ will be maintained out of contact with the ring $a$ or its supporting structure $b$.

To enable the ring $a$ to frictionally engage the walls $b$ of the chamber the said ring $a$ may be of larger diameter than the walls $b$ of the chamber and be divided at one place $j$ the gap produced by the division being sufficient to enable the ring $a$ to be closed to a reduced diameter for location in position.

Alternatively the ring $a$ may be fixed in the chamber as illustrated in Fig. 3 and have more than one set of points $c$ of anchorage so that the points of attachment of the chains $f$ may be varied when the location of the travel of the float $d$ is changed.

I claim:—

1. A float controlled device comprising a chamber for the float, a float and chains or the like adapted to limit the oscillation of the float characterized by the arrangement of an auxiliary structure to which one end of each chain viz, that remote from its attachment to the float is anchored; said points of anchorage being adapted to be displaced so as to adjust the relative conditions of float and anchorage when the travel of the float is changed in any way.

2. A float controlled device as claimed in claim 1 characterized by the arrangement of the points of anchorage on a ring.

3. A float controlled device as claimed in claim 2 characterized by the division of the ring at one place so as to enable its diameter to be reduced for disposition in place and to cause it to frictionally engage the walls of the chamber within which it is inserted for maintaining it in any selected position.

In testimony whereof I have signed my name to this specification in the presence of two subscribing witnesses.

ARTHUR RONALD TRIST.

Witnesses:
CHAS. S. R. BULLOUGH,
BEATRICE GEOMAR.